United States Patent [19]

Bivens

[11] 4,110,865

[45] Sep. 5, 1978

[54] ADJUSTABLE WIDTH SIDE BRUSH ARRANGEMENT FOR LARGE VEHICLE WASHING MACHINES

[75] Inventor: David J. Bivens, Danville, Va.

[73] Assignee: Bivens-Winchester Corporation, Ann Arbor, Mich.

[21] Appl. No.: 774,863

[22] Filed: Mar. 7, 1977

[51] Int. Cl.² ............................................... B60S 3/06
[52] U.S. Cl. ............................. 15/53 AB; 15/DIG. 2
[58] Field of Search ............... 15/53 A, 53 AB, 53 R, 15/DIG. 2, 97 B

[56] References Cited

U.S. PATENT DOCUMENTS

| 2,705,810 | 4/1955 | McDermott | 15/53 AB |
| 3,500,488 | 3/1970 | Grant | 15/53 AB |
| 3,588,935 | 6/1971 | Anttila | 15/53 A |
| 3,793,667 | 2/1974 | Capra | 15/53 A |
| 4,028,766 | 6/1977 | Bivens | 15/53 AB |

FOREIGN PATENT DOCUMENTS 1,936,906   2/1971   Fed. Rep. of Germany .... 15/DIG. 12

*Primary Examiner*—Edward L. Roberts
*Attorney, Agent, or Firm*—Krass & Young

[57] ABSTRACT

A vehicle washing machine is disclosed, of a type particularly adapted for washing relatively large vehicles, such as buses, vans, trucks, etc. featuring a mounting arrangement for a pair of side brushes which are disposed in the wash lane so as to scrub the sides of the washed vehicles. The mounting of each swing frame arrangement includes a swing frame on which each brush is rotatably mounted, inclined to the horizontal, and pivotally mounted to the frame so as to be able to pivot into engagement with the vehicle side. Each swing frame is urged into engagement with a vehicle passing between the side brushes by a shock absorber-spring assembly acting on the upper end of the swing frame urging the brush into the wash lane, while accommodating minor in and out movements due to variations in the vehicle contour, side motions, etc., the shock absorber damping the resulting oscillations of the swing frame. The adjustable width arrangement is provided by an air cylinder-cable combination connecting both swing frames and adapted to draw the swing frames together upon sensing the presence of a narrow width vehicle by operation of the air cylinder to adapt the machine to the narrow width vehicle. The resulting driving connection between the swing frames allows simultaneous swinging movement of the swing frames due to accommodate a limited off-centering position of the vehicle in the wash lane while maintaining the width between the brushes. Each swing frame is also disclosed as carrying a motor-gear unit combination utilized to rotate each side brush while the vehicle is passing between the side brushes, and is also disclosed as being adjustably mounted to the machine frame to provide an adjustable skew angle between the brushes.

10 Claims, 4 Drawing Figures

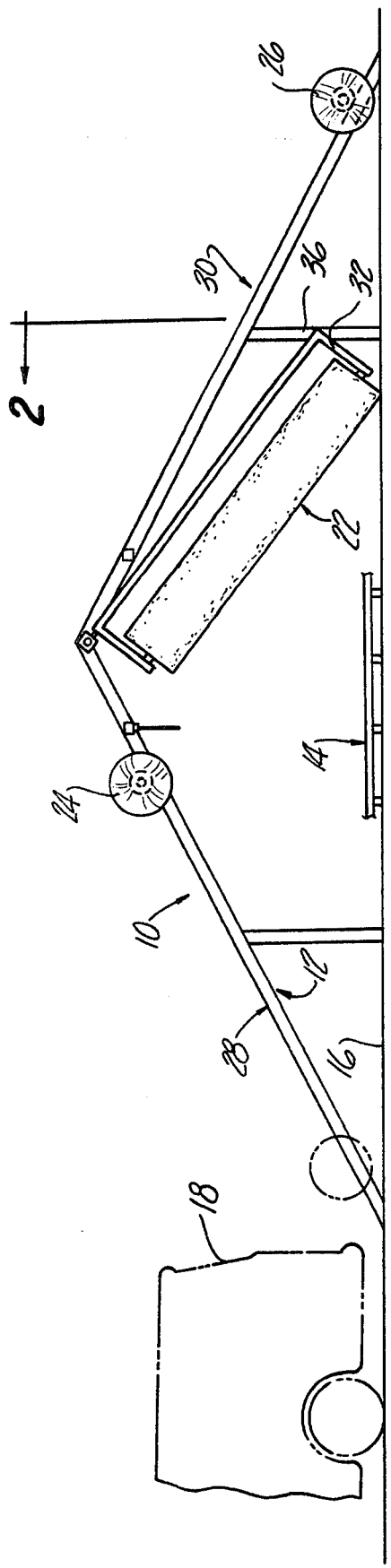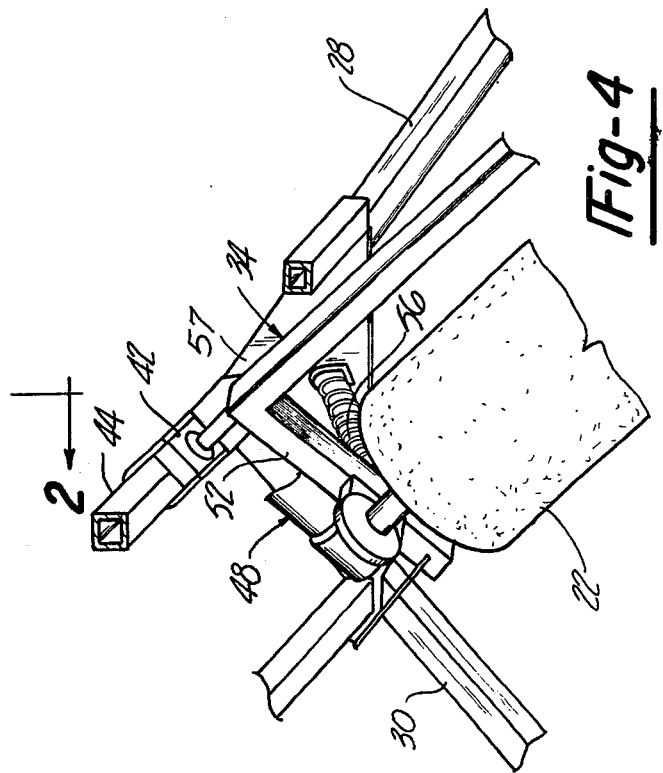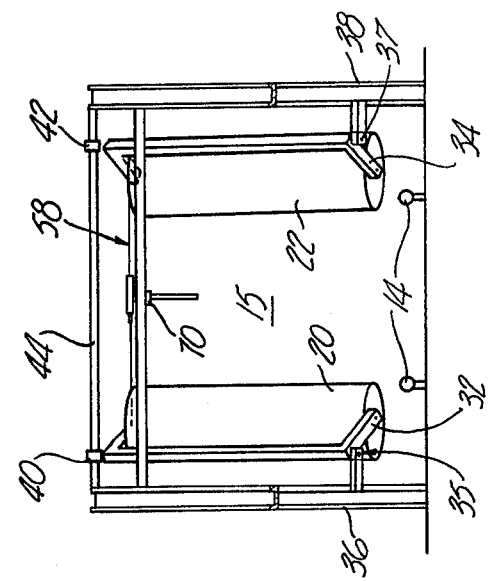

ADJUSTABLE WIDTH SIDE BRUSH ARRANGEMENT FOR LARGE VEHICLE WASHING MACHINES

BACKGROUND OF THE INVENTION

1. Field of the Invention.

This invention concerns vehicle washing machines and more particularly vehicle washing machines adapted to wash relatively large vehicles, such as buses and vans. Co-pending Pat. application Ser. No. 666,123, filed on Mar. 11, 1976, now U.S. Pat. No. 4,028,766, discloses a vehicle washing machine particularly adapted to wash large vehicles such as buses, vans, etc. which arrangement includes front and rear horizontally disposed brushes which are adapted to wash the top, front, and rear exterior portions of such vehicles by moving in a guide track structure so as to follow the contour of the vehicle by virtue of being mounted on an inclined frame-work. Also disclosed are a pair of inclined brushes, which are located to engage the vehicle as it passes through the wash lane machine while the brushes are rotating to scrub the vehicle sides. While the horizontally extending front and rear brushes are adaptable to vehicles of different heights, the side brushes are adapted to accommodate only minor variations in vehicle widths and if a single such machine were to be adapted to vehicles of substantially varying widths, such as buses and vans, substantial modification of the machine would be necessitated.

Another problem encountered in adapting such machines to vehicles of substantially varying width is that guiding of the vehicle in the wash lane is rendered more difficult such that there is an increased possibility of the vehicle passing through the machine in an off center line of movement. Such off center condition may result in one of the side brushes coming into increasingly heavy engagement with one of the vehicle sides while the oppositely disposed side brush would be in increasingly reduced pressure engagement, essentially causing excessive brush pressure on the other side, if the centering of the vehicle is beyond the slight variations normally accommodated by the mounting of such brushes.

Accordingly, it is an object of the present invention to provide a vehicle washing machine which is readily and automatically adaptable to vehicles substantially varying side widths.

It is another object of the present invention to provide a vehicle washing machine of the type having side brushes adapted to scrub the vehicle side with a mounting arrangement for such side brushes which accommodates off center positioning of the vehicle with respect to the brushes, without creating either excessive or inadequate side brush pressure, as the vehicle passes between the brushes.

SUMMARY OF THE INVENTION

These and other objects which will become apparent upon a reading of the following specification and claims is accomplished by mounting each of the side brushes to a swing frame adapted to produce swinging motion of the brush into engagement with the vehicle with a non-extensible connection comprised of a variable length air cylinder-cable combination connected to each of the swing frames, to position the brushes at different spacings therebetween. Each of the frames is mounted along an inclined axis so as to tend to out from the wash lane but is positioned to accommodate large vehicles by a shock absorber-spring combination acting on the swing frame to oppose the tendency to swing outwardly. Upon sensing of the presence of a vehicle of a relatively small size, the air cylinder is automatically operated causing the swing frame to be drawn together to be positioned to properly engage the narrow width vehicle. By a virtue of swing frames being tied to each other by the air cylinder-cable combination which in turn is free to move with the swing frames, the swing frames swing together about their respective pivotal mountings so as to accommodate varying off center conditions of the vehicle with respect to the brushes without producing excessive or inadequate brush pressures on the vehicle side.

DESCRIPTION OF THE DRAWINGS

FIG. 1 is a side sectional view of a vehicle washing machine according to the present invention;

FIG. 2 is an endwise partially sectional view of the machine shown in FIG. 1 depicting the mounting of the side brush swing frames;

FIG. 4 is a perspective view of the details of the motor drive and other details of the upper portion of one of the swing frame assemblies.

DETAILED DESCRIPTION

Figure 3:
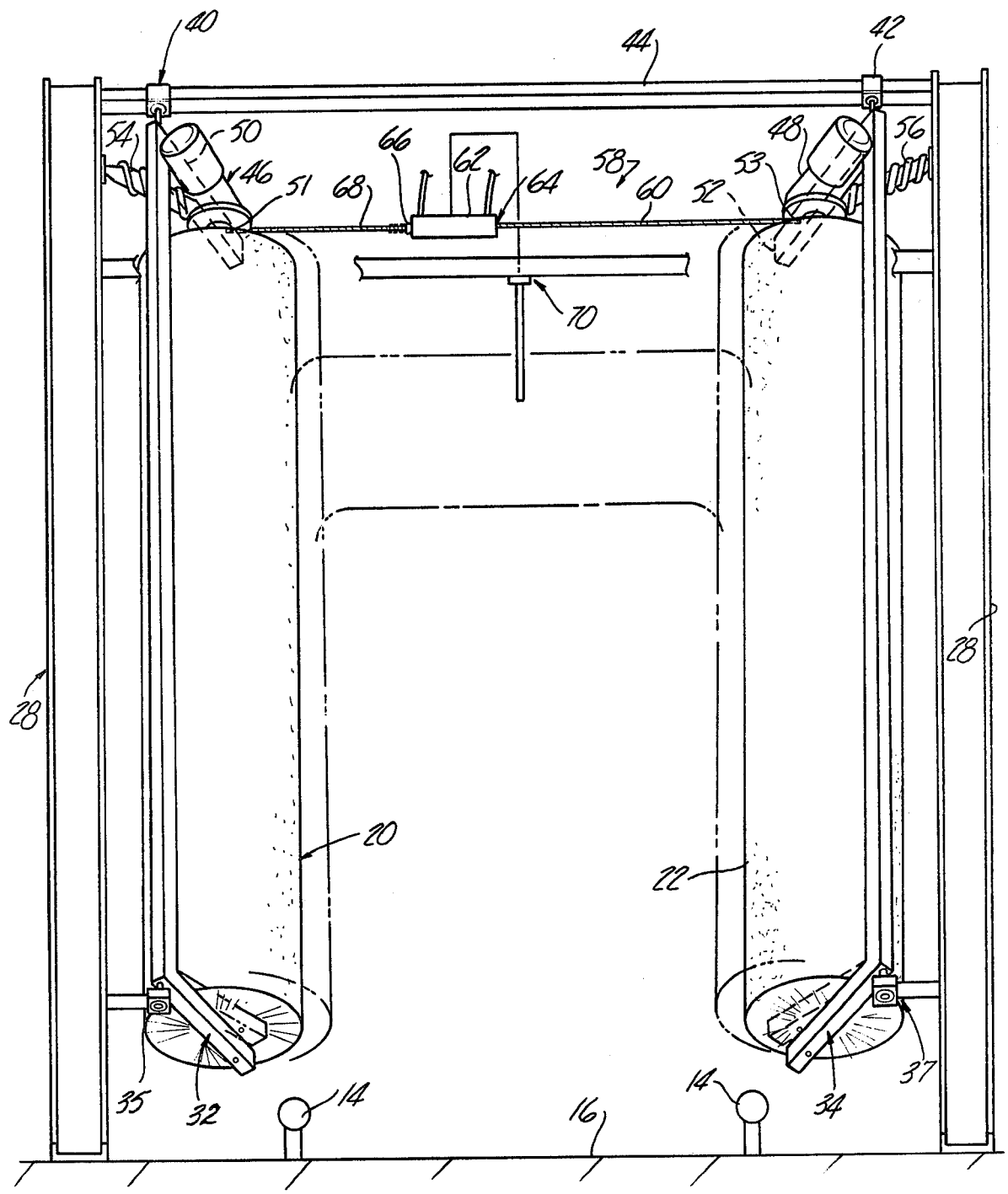
FIG. 3 is a front elevational view of a pair of swing frame side brush assemblies and the installation and operation of the air cylinder-cable combination.

In the following specification, specific terminology will be utilized for the sake of clarity and a specific embodiment described in accordance with the requirements of 35 USC 112, but it is to be understood that this is not intended to be limiting, and indeed, should not be so construed, inasmuch as the invention is capable of taking many forms and variations within the scope of the appended claims.

Referring to the drawings, and particularly to FIG. 1, a vehicle washing machine 10 is depicted which includes a frame 12 providing a support for a brush system. Also included is an appropriate water spray system, shown partially at 14, and defining an opening 15, a concrete pad 16 along the vehicle wash lane having appropriate catch drains, all as disclosed in further detail in the aforementioned patent application.

A vehicle, shown as a bus 18 is shown about to pass into the machine and between respective sets of brushes included in the brush system. The brush system includes a pair of side brushes 20 and 22, and a pair of horizontally extending brushes 24 and 26.

The horizontal brushes 24 and 26 act to wash the top, front, and rear contours of the vehicle by movement up and down inclined rail sets 28 and 30, as the vehicle passes through the machine. Inasmuch as the details of these aspects of the vehicle washing machine 10 are disclosed in the afore-mentioned patent application and do not form a part of the present invention by themselves, details of this mechanism and the control system therefore are omitted in the drawings and a description is not here included, reference being made to that application for obtaining these.

Each of the side brush sets 20 and 22 are inclined to the horizontal by being mounted on a swing frame 32 and 34, respectively, the brushes 20 and 22 extending in vertical height a distance sufficient to fully engage the entire side of the vehicle as the vehicle is driven through the machine.

Each swing frame 32 and 34 is pivotally mounted at one end by means of a pivot bearing assembly 35 and 37, each mounted to a vertical strut 36 and 38, respectively and, at the upper end by means of a pivot bearing assembly 40 and 42, respectively, carried by a cross bar 44 forming a part of the machine frame 12. The pivot bearing assemblies 40 and 42 are adjustably moveable on the cross bar 44 in order to adjust the skew of the brushes with a slight inward slant being desirable for most vehicle contours. This is a one time adjustment which would normally occur at assembly, as distinguished from the automatic width adjustment which will be disclosed hereinafter.

Each brush 20 and 22 is caused to be rotated on its respective swing frame 32 and 34 about an axis parallel to the pivotal axis of the swing frame 32 or 34 by means of an electric motorgear unit assembly 46 and 48, respectively, each of which is mounted to one of the upper side struts 50 and 52, respectively, of the swing frames 32 and 34 so as to move together with the brush 20 or 22. The positioning of the axis of each swing frame 32 and 34, with respect to the vertical is such that the weight of the assemblage carried thereby tends to rotate each swing frame 32 and 34 so as to move the brushes 20 and 22 downwardly and outwardly, as viewed in FIG. 3. This tendency is resisted by respective spring-shock absorber assemblies 54 and 56, each of which is comprised of a compression spring and a shock absorber cylinder mounted to gussets 57 which acts to damp out fluctuations or oscillations of the brushes 20 and 22 about the pivot point provided by the respective pivot bearing assemblies 35, 37, 40 and 42. The spring rate is selected so as to maintain the brush units 20 and 22 firmly in engagement with the relatively wide width vehicle sides.

The adjustable width of the gap between the respective brushes 20 and 22 is achieved by the use of a connection therebetween nonextensible under pressure exerted by the brushes, comprised of a variable length air power cylinder-cable combination 58, drivingly connecting the swing frames 32 and 34. As best seen in FIG. 3, this combination includes a first length of flexible cable 60, connected to the swing frame 24 by a connection with the upper strut 52 at 53 and to the cylinder body 62 of a pneumatic air cylinder indicated generally by the numeral 64. The operating rod 66 of the air cylinder 64 is connected via a second length of cable 68 to the swing frame 32 by a connection to the upper strut 50 at 51 to thus provide a means for connecting each swing frame 32 and 34 to cause the same to swing together, the air cylinder 64 being free floating so as to allow simultaneous side-to-side movement of the swing frames 32 and 34.

The air cylinder 64, upon being retracted draws together the swing frames 32 and 34 so as to reduce the width of the gap therebetween for vehicles of a lesser width.

The activation of the air cylinder 64 is automatically triggered by use of a depending wand assembly 70 which is located on cross bar 72 at a height so as to sense the presence of a relatively large vehicle, to trigger a control signal to a solenoid valve (not shown) to activate suitable depressurization of the cylinder 64 and release of the swing frames 32 and 34 to the extended position by virtue of the assemblies acting under gravity, spreading outwardly to the extended position.

It can be appreciated that this arrangement solves the problem described above as to off centered positioning of the vehicle as it passes through the machine, since if either of the brushes 20 or 22 experiences a heavier pressure engagement with the vehicle, this brush would tend to move out of a way against the bias of its associated spring cylinder assembly 54 or 56, while drawing in the opposite brush assembly 20 or 22, to maintain the proper equalized pressure for both brushes.

It can be seen that this arrangement very effectively accomplishes the objects of the present invention with a minimum of structure and controls, since the air cylinder-cable combination requires only a simple on-off control, but can quickly adapt the machine to vehicle width of substantial variation. In so doing, it does not compromise the capability of the brush assemblies for adapting to the minor surface contour variations of the vehicle and at the same time the off-centering problem is very effectively solved, since the contour brush gap is maintained notwithstanding the mispositioning of the vehicle in the wash lane so that excessive or inadequate brush pressures are avoided.

The embodiments of the invention in which an exclusive property or privilege is claimed are defined as follows:

1. A vehicle washing machine comprising:
   a machine frame defining an opening for receiving said vehicle;
   a brushing system mounted to said machine frame and adapted to engage said vehicle upon passage of said vehicle therethrough, said brush system including a pair of said brushes disposed on either side of said opening;
   brush support means supporting said side brushes so as to engage the vehicle sides as said vehicle passes through said opening said support means including a corresponding pair of swing frames mounting a respective brush in each of said swing frames for rotation about an axis thereon;
   said support means further including means pivotally mounting each of said swing frames so as to swing into and out of said opening about a pivot axis parallel to said axis of rotation of said brushes
   means drivingly connecting each of said swing frames to each other, said means being nonextensible under pressure exerted by said brushes, causing said swing frames to pivot together about each of said pivotal support means in a side-to-side movement to accommodate off-centering of said vehicle;
   means for varying the length of said means drivingly connecting said swing frames, whereby said gap between said brushes may be adjusted and said vehicle washing machine is adapted to accommodate vehicles of varying widths while allowing centering side-to-side movment of said brushes.

2. The vehicle washing machine according to claim 1 wherein said means mounting said swing frames inclines said swing frames at an angle to the horizontal, whereby the weight of said brushes biases said movement of said brushes downwardly and outwardly.

3. The vehicle washing machine according to claim 2 wherein said means mounting said swing frames includes spring means biasing said pivot frame assemblies inwardly towards said central opening, whereby said gravity bias is countered by said spring means.

4. The vehicle washing machine according to claim 1 wherein said means drivingly connecting together said swing frames comprises a cable means and a power cylinder connected to said cable means and wherein operation of said power cylinder causes extension or retraction of said cable means whereby said spacing of said brushes may thereby be varied.

5. The vehicle washing machine according to claim 4 wherein said cable-cylinder combination includes flexible cable means.

6. The vehicle washing machine according to claim 4 wherein said means mounting said swing frames includes means mounting said swing frames for pivotal movement along axes inclined to the horizontal, whereby the weight of said brush assemblies biases said swing frame movement outward from said central opening.

7. The vehicle washing machine according to claim 6 further including resilient bias means connecting on said swing frames to bias said frames oppositely to said bias produced by said weight of said brushes.

8. The vehicle washing machine according to claim 7 wherein said resilient bias means includes damping means damping pivotal movements of said means of said pivot frames about said pivotal mounting, thereby movements of said brush assemblies in response to creations in said vehicle contours may be damped.

9. The vehicle washing machine according to claim 1 wherein each of said swing frames carries drive means for rotating said brush on said swing frame.

10. The vehicle washing machine according to claim 1 wherein said swing frame includes means adjustably securing one end of said pivot swing frame on said vehicle washing machine frame, whereby the position of the brush axes may be adjusted.

* * * * *